(12) United States Patent
Shibutani et al.

(10) Patent No.: US 11,777,074 B2
(45) Date of Patent: Oct. 3, 2023

(54) SECONDARY BATTERY POSITIVE ELECTRODE AND SECONDARY BATTERY

(71) Applicant: Panasonic Intellectual Property Management Co., Ltd., Osaka (JP)

(72) Inventors: Satoshi Shibutani, Osaka (JP); Yuki Tokuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 387 days.

(21) Appl. No.: 17/273,465

(22) PCT Filed: Jul. 25, 2019

(86) PCT No.: PCT/JP2019/029133
§ 371 (c)(1),
(2) Date: Mar. 4, 2021

(87) PCT Pub. No.: WO2020/054224
PCT Pub. Date: Mar. 19, 2020

(65) Prior Publication Data
US 2021/0218013 A1    Jul. 15, 2021

(30) Foreign Application Priority Data
Sep. 14, 2018 (JP) .................. 2018-172624

(51) Int. Cl.
*H01M 4/131* (2010.01)
*H01M 4/38* (2006.01)
(Continued)

(52) U.S. Cl.
CPC ........... *H01M 4/131* (2013.01); *H01M 4/381* (2013.01); *H01M 4/58* (2013.01); *H01M 4/621* (2013.01);
(Continued)

(58) Field of Classification Search
CPC ............................. H01M 4/661; H01M 4/667
See application file for complete search history.

(56) References Cited

U.S. PATENT DOCUMENTS 6,844,114 B2 *   1/2005  Gauthier ................. H01M 4/66
                                                 429/232
2013/0089781 A1   4/2013  Miyazaki et al.
(Continued)

FOREIGN PATENT DOCUMENTS

JP   2016-72221 A    5/2016
JP   2016-127000 A   7/2016
(Continued)

OTHER PUBLICATIONS

English Translation of International Search Report dated Oct. 29, 2019, issued in counterpart Application No. PCT/JP2019/029133. (2 pages).

*Primary Examiner* — Stephan J Essex
(74) *Attorney, Agent, or Firm* — WHDA, LLP

(57) ABSTRACT

This positive electrode includes a current collector, an intermediate layer which is formed at least on one surface of the current collector, and a composite material layer which is formed on the intermediate layer. The intermediate layer includes metal compound particles, a conductive material, and a binding material. The metal compound particles comprise at least one selected from a sulfated oxide, hydroxide, or oxide of alkali earth metal or alkali metal.

12 Claims, 2 Drawing Sheets

(51) Int. Cl.
*H01M 4/58* (2010.01)
*H01M 4/62* (2006.01)
*H01M 4/66* (2006.01)
*H01M 10/05* (2010.01)
*H01M 4/02* (2006.01)

(52) U.S. Cl.
CPC ........... H01M 4/661 (2013.01); H01M 4/666 (2013.01); H01M 10/05 (2013.01); *H01M 2004/028* (2013.01)

(56) References Cited

U.S. PATENT DOCUMENTS

| | | |
|---|---|---|
| 2013/0224587 A1 | 8/2013 | Uemura |
| 2016/0093922 A1* | 3/2016 | Endo ................. H01M 10/4235 429/233 |
| 2016/0190566 A1 | 6/2016 | Shiozaki et al. |

FOREIGN PATENT DOCUMENTS

| | | |
|---|---|---|
| WO | 2012/005301 A1 | 1/2012 |
| WO | 2012/057031 A1 | 5/2012 |

* cited by examiner

SECONDARY BATTERY POSITIVE ELECTRODE AND SECONDARY BATTERY

TECHNICAL FIELD

The present disclosure relates to a positive electrode for a secondary battery and a secondary battery.

BACKGROUND ART

A positive electrode for a secondary battery in which an intermediate layer mainly including an aluminum oxide is formed between a current collector and a mixture layer has been known (see Patent Literature 1, and the like). The intermediate layer disclosed in Patent Literature 1 has a thickness of 1 μm to 5 μm and includes an aluminum oxide, a conductive material, and a binder. Patent Literature 1 has described that it is possible to suppress the heat generated by the redox reaction between a positive electrode active material and an aluminum current collector while maintaining good current collectability.

CITATION LIST

Patent Literature

PATENT LITERATURE 1: Japanese Unexamined Patent Application Publication No. 2016-127000

SUMMARY

It is important to suppress heat generation when an abnormality such as an internal short circuit occurs in a secondary battery such as a lithium ion battery. The technology disclosed in Patent Literature 1 is expected to have the above effect, but there is room for improvement in the suppression of heat generation when an internal short circuit occurs. In addition, it is an important subject to suppress gas generation during high temperature storage in a secondary battery.

The positive electrode for a secondary battery according to one aspect of the present disclosure comprises a current collector, an intermediate layer formed on at least one surface of the current collector, and a mixture layer formed on the intermediate layer. The intermediate layer includes metal compound particles, a conductive agent, and a binder, and the metal compound particles are composed of at least one selected from a sulfate, hydroxide, and oxide of an alkaline earth metal or alkali metal.

The secondary battery according to one aspect of the present disclosure comprises the above positive electrode, a negative electrode, and an electrolyte.

The positive electrode for a secondary battery according to one aspect of the present disclosure can suppress heat generation when an internal short circuit of the battery occurs and gas generation during high temperature storage.

DESCRIPTION OF EMBODIMENTS

As described above, it is an important issue to suppress heat generation when an internal short circuit of the battery occurs and gas generation during high temperature storage in a secondary battery such as a lithium ion battery. In order to solve such problems, the present inventors have focused on the intermediate layer of the positive electrode interposed between the positive electrode current collector and the positive electrode mixture layer and have performed intensive investigations. As a result, it was found that the above heat generation and gas generation are suppressed by providing an intermediate layer mainly including metal compound particles that are composed of at least one selected from a sulfate, hydroxide, and oxide of an alkaline earth metal or alkali metal.

When an internal short circuit of the secondary battery occurs, it is considered that the intermediate layer mainly including the above metal compound particles will suppress the redox reaction between the positive electrode current collector and the positive electrode active material to suppress heat generation of the battery. In addition, when the secondary battery is left in a high temperature environment for a long time, fluoric acid produced in the battery promotes decomposition of an electrolyte to cause gas generation, but it is considered that the above metal compound particles efficiently capture the fluoric acid to suppress gas generation.

Hereinafter an example of the embodiment of the positive electrode for a secondary battery and the secondary battery according to the present disclosure will be described in detail. Hereinafter, a cylindrical battery in which a wound electrode body 14 is housed in a cylindrical battery case is exemplified, and the electrode assembly is not limited to the wound type, and may be a laminate in which a plurality of positive electrodes and a plurality of negative electrodes are alternately laminated one by one via a separator. In addition, the secondary battery according to the present disclosure may be a rectangular battery having a rectangular metal case, a coin battery having a coin-shaped metal case, or the like, and a laminated battery including an exterior body being composed of a laminate sheet including a metal layer and a resin layer.

Figure 1:
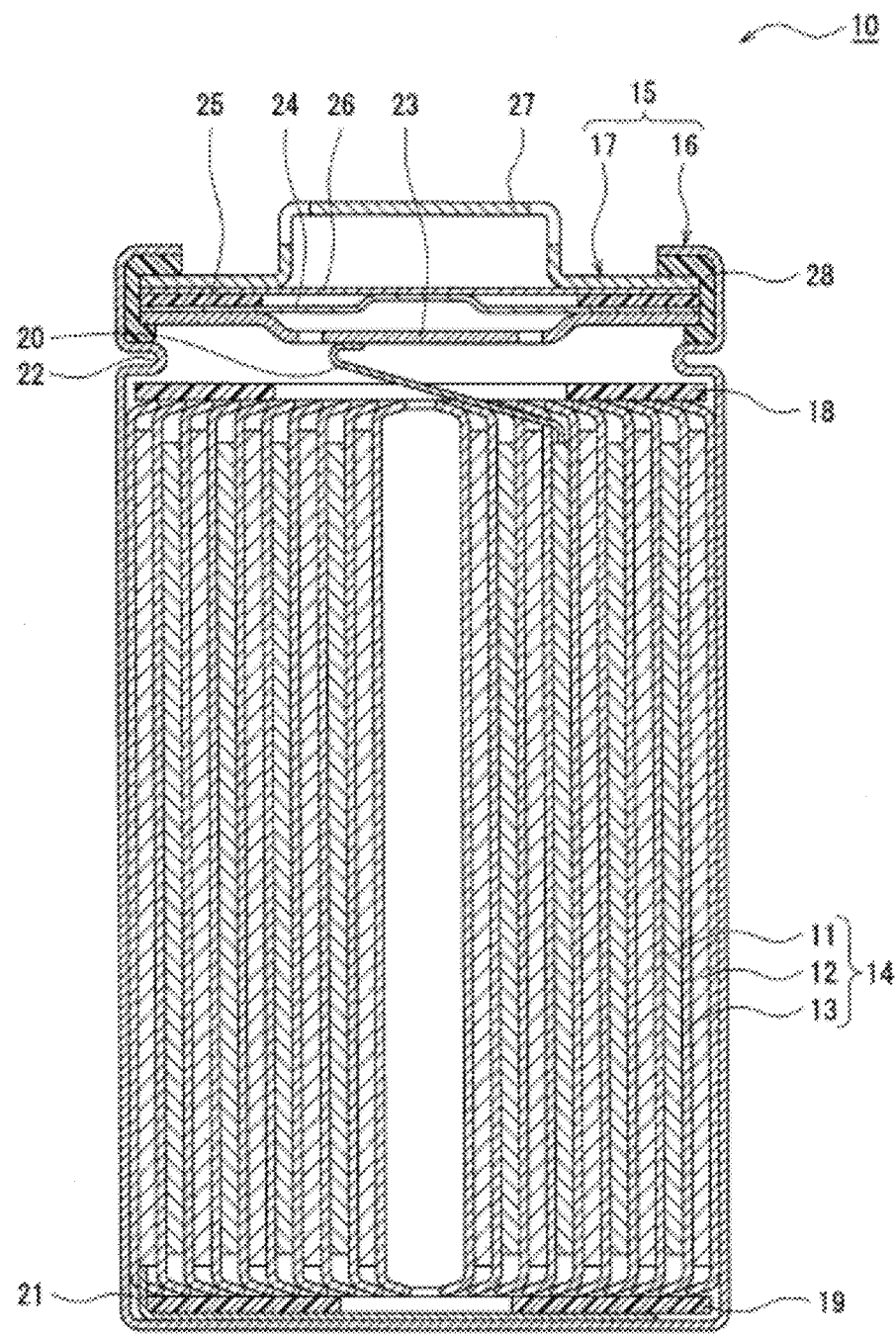
FIG. 1 is a sectional view of a secondary battery according to an example of the embodiment.

FIG. 1 is a sectional view of a secondary battery 10 according to an example of the embodiment. As illustrated in FIG. 1, the secondary battery 10 includes an electrode assembly 14, an electrolyte, and a battery case 15 that houses the electrode assembly 14 and the electrolyte. The electrode assembly 14 includes a positive electrode 11, a negative electrode 12, and a separator 13, and has a wound structure in which the positive electrode 11 and the negative electrode 12 are wound via the separator 13. A battery case 15 is composed of a bottomed cylindrical exterior can 16 and a sealing assembly 17 that closes the opening of the exterior can 16. The secondary battery 10 may be a secondary battery using an aqueous electrolyte, or may be a secondary battery using a non-aqueous electrolyte. Hereinafter, the secondary battery 10 will be described as a non-aqueous electrolyte secondary battery such as a lithium ion battery using a non-aqueous electrolyte.

A non-aqueous electrolyte includes a non-aqueous solvent and an electrolyte salt dissolved in the non-aqueous solvent. For example, esters, ethers, nitriles, amides, and a mixed solvent of two or more thereof may be used as the non-aqueous solvent.

The non-aqueous solvent may contain a halogen substitute such as a fluoroethylene carbonate in which at least a part of hydrogen of these solvents is substituted with a halogen atom such as fluorine. The non-aqueous electrolyte is not limited to a liquid electrolyte, and may be a solid electrolyte. A lithium salt such as $LiPF_6$ is used as the electrolyte salt.

The secondary battery 10 includes insulating plates 18 and 19 arranged above and below the electrode assembly 14, respectively. In the example shown in FIG. 1, a positive electrode lead 20 attached to the positive electrode 11 extends to the side of the sealing assembly 17 through the through hole of the insulating plate 18, and a negative electrode lead 21 attached to the negative electrode 12 extends to the bottom side of the exterior can 16 through the outside of the insulating plate 19. The positive electrode lead 20 is connected to the lower surface of a bottom plate 23 of the sealing assembly 17, by welding or the like, and a cap 27, which is a top plate of the sealing assembly 17 electrically connected to the bottom plate 23, serves as a positive electrode terminal. The negative electrode lead 21 is connected to the inner surface of bottom of the exterior can 16 by welding or the like, and the exterior can 16 serves as a negative electrode terminal.

The exterior can 16 is, for example, a metal container with a bottomed cylindrical shape. A gasket 28 is provided between the exterior can 16 and the sealing assembly 17 to ensure the sealability inside the battery. The exterior can 16 has a projecting portion 22 for supporting the sealing assembly 17, in which a part of the side surface of the exterior can 16 protrudes inward. The projecting portion 22 is preferably formed in an annular shape along the circumferential direction of the exterior can 16, and the sealing assembly 17 is supported on the upper surface thereof.

The sealing assembly 17 has a structure in which a bottom plate 23, a lower vent member 24, an insulating member 25, an upper vent member 26, and a cap 27 are laminated in this order from the electrode assembly 14 side. Each member constituting the sealing assembly 17 has a disk shape or ring shape, for example, and each member except the insulating member 25 is electrically connected each other. The lower vent member 24 and the upper vent member 26 are connected together at their respective central portions, and the insulating member 25 is interposed between the respective peripheral portions. When the internal pressure of the battery rises due to abnormal heat generation, the lower vent member 24 is deformed and broken so as to push the upper vent member 26 toward the cap 27 side, and the current path between the lower vent member 24 and the upper vent member 26 is blocked. When the internal pressure further rises, the upper vent member 26 is broken and gas is discharged from the opening of the cap 27.

Hereinafter, the positive electrode 11, the negative electrode 12, and the separator 13 constituting the electrode assembly 14, particularly the positive electrode 11 will be described in detail.

[Positive Electrode]

Figure 2:
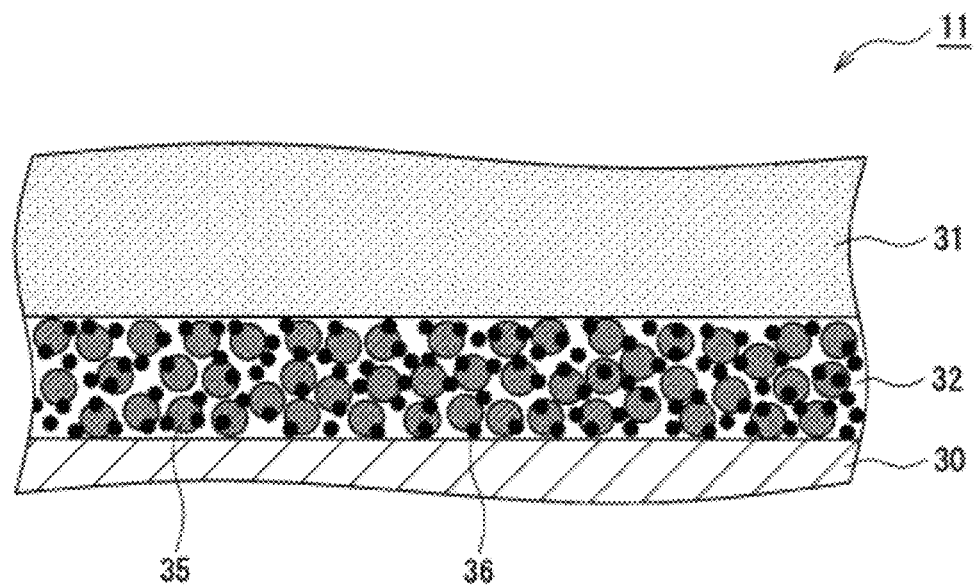
FIG. 2 is a sectional view of a positive electrode according to an example of the embodiment.

FIG. 2 is a sectional view of the positive electrode 11 according to an example of the embodiment. As exemplified in FIG. 2, the positive electrode 11 comprises: a positive electrode current collector 30; an intermediate layer 32 formed on at least one surface of the positive electrode current collector 30; and a positive electrode mixture layer 31 formed on the intermediate layer 32. The intermediate layer 32 is preferably formed on both sides of the positive electrode current collector 30. The positive electrode mixture layer 31 includes a positive electrode active material, a conductive agent, and a binder, and is formed on both sides of the positive electrode current collector 30 via the intermediate layer 32. The surface of the positive electrode current collector 30 may have an area in which the intermediate layer 32 is not formed, and in this area, the positive electrode mixture layer 31 is formed directly on the positive electrode current collector 30.

The positive electrode 11 is produced by applying the intermediate layer slurry on both sides of the positive electrode current collector 30, drying the coating film to form the intermediate layer 32, and then forming a positive electrode mixture layer 31 on the intermediate layer 32. The positive electrode mixture layer 31 is formed on both sides of the positive electrode current collector 30 via the intermediate layer 32 by applying onto the intermediate layer 32 a positive electrode mixture slurry including a positive electrode active material, a conductive agent, a binder, and the like, drying the coating film, and then compressing the coating film.

A foil of a metal stable in the potential range of the positive electrode 11 such as aluminum or aluminum alloy, a film in which the metal is disposed on the surface, or the like can be used as the positive electrode current collector 30. The content of aluminum in the positive electrode current collector 30 is 50% or more, preferably 70% or more, and more preferably 80% or more with respect to the mass of the current collector. The preferable positive electrode current collector 30 is a metal foil consisting of aluminum or an aluminum alloy and has a thickness of 5 μm to 20 μm.

A lithium-containing transition metal composite oxide containing transition metal elements such as Co, Mn, and Ni is used as the positive electrode active material. Examples of the lithium-containing transition metal composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of the group consisting of Na, Mg, Sc, Y Mn, Fe, Co, Ni, Cu, Zn, Al, Cr, Pb, Sb, and B $0<x\leq1.2$, $0<y\leq0.9$, $2.0\leq z\leq2.3$). These may be used singly or in combination of two or more.

Examples of the conductive agent included in the positive electrode mixture layer 31 include carbon materials such as carbon black (CB), acetylene black (AB), ketjen black, and graphite. Examples of the binder included in the positive electrode mixture layer 31 include fluorine resins such as polytetrafluoroethylene (PTFE) and polyvinylidene fluoride (PVdF), polyacrylonitrile (PAN), polyimide resins, acrylic resins, and polyolefin resins. In addition, these resins may be used in combination with carboxymethylellulose (CMC) or a salt thereof, or polyethylene oxide (PEO). These may be used singly or in combination of two or more.

As described above, the intermediate layer 32 is interposed between the positive electrode current collector 30 and the positive electrode mixture layer 31. The intermediate layer 32 includes the metal compound particles 35, the conductive agent 36, and a binder, and is composed of the metal compound particles 35 as the main component. The main component means a component with the highest mass among the constituent materials of the intermediate layer 32. When only metal compound particles 35 are used as inorganic particles, the content of the metal compound particles 35 is preferably 70 to 99% by mass, more preferably 80 to 98% by mass, and particularly preferably 90 to 97% by mass, with respect to the mass of the intermediate layer 32. The thickness of the intermediate layer 32 is not particularly limited, but is preferably 1 μm to 10 μm or 1 μm to 5 μm.

The metal compound particles 35 are particles that are composed of at least one selected from a sulfate, hydroxide, and oxide of an alkaline earth metal (Be, Mg, Ca, Sr, Ba Ra) or an alkaline metal (Li, Na, K, Rb, Sc, Fr). Provision of the intermediate layer 32 mainly including the metal compound particles 35 can significantly suppress heat generation when an internal short circuit occurs and gas generation during high temperature storage or during the charge-and-discharge cycle. When a positive electrode current collector 30 mainly including aluminum is used, the redox reaction between the positive electrode current collector 30 and the lithium-containing metal composite oxide may cause significant heat generation, but the intermediate layer 32 separates the positive electrode current collector 30 from the positive electrode mixture layer 31, thereby suppressing the heat generated by the redox reaction. In addition, the metal compound particles 35 are considered to efficiently capture the fluoric acid that causes gas generation.

The alkaline earth metal and alkaline metal contained in the metal compound particles 35 are preferably Mg, Ca, Sr, Ba, and Li, and particularly preferably Mg, Ba, and Li. Examples of the preferable metal compound particles 35 include at least one selected from barium sulfate particles ($BaSO_4$ particles), magnesium hydroxide particles ($Mg(OH)_2$ particles), magnesium oxide particles (MgO particles), and lithium oxide particles ($Li_2O$ particles). In the intermediate layer 32, one type of metal compound particles 35 may be used singly or two or more types of metal compound particles 35 may be used in combination.

The volume-based median diameter (D50) of the metal compound particles 35 is, for example, 0.05 μm to 2 μm, and is preferably 0.1 μm to 1 μm. The median diameter of the metal compound particles 35 is a particle size at which the volume integrated value is 50%, in the particle size distribution measured by the laser diffraction scattering method. In addition, the aspect ratio of metal compound particles 35 is 2 or more, for example. The aspect ratio of the metal compound particle 35 is calculated by observing the cross section of a negative electrode with a scanning electron microscope (SEM) and averaging the geometry analysis results of 100 particles randomly selected from the resultant SEM image.

The Mohs hardness of the metal compound particles 35 is, for example, 7 or less, or 5 or less. Flexible particles with low Mohs hardness may increase the flexibility of the intermediate layer 32 and improve the bending resistance of the positive electrode 11. The method of measuring Mohs hardness is as follows (the same applies to metal phosphate particles 37 described below).

[Method of Measuring Mohs Hardness]

The metal compound particles 35 are rubbed with each of minerals used as a class in the 10-stage Mohs hardness meter MH-10 manufactured by YAGAMI INC., and then the presence or absence of scratches is observed for the metal compound particles 35 and each of the minerals in a particular class. When both the metal compound particles 35 and the minerals in a particular class are scratched or not scratched, the Mobs hardness of the metal compound particles 35 is determined to be the same class as the minerals in the particular class. In addition, in the minerals in all classes, when either the metal compound particles 35 or the minerals in a particular class is scratched, the Mohs hardness of the metal compound particles 35 is determined to be the value 0.5 higher than the class of the mineral of the highest class that did not scratch the metal compound particles 35 among all minerals.

One that is the same as the conductive agent applied to the positive electrode mixture layer 31 can be used as the conductive agent 36 included in the intermediate layer 32, for example, conducting particles such as CB, AB, ketjen black, and graphite. The conductive agent 36 attaches to the surface of the metal compound particles 35 by the binder and forms a conductive path in the intermediate layer 32. The content of the conductive agent 36 is preferably 0.5 to 10% by mass, and more preferably 1 to 5% by mass, with respect to the mass of the intermediate layer 32. When the content of the conductive agent 36 is within this range, a good conductive path will be formed in the intermediate layer 32.

One that is the same as the conductive agent applied to the positive electrode mixture layer 31 can be used as the binder included in the intermediate layer 32, for example fluorine resins such as PTFE and PVdF, PAN, polyimide resin, acrylic resin, and polyolefin resin. Of these, PVdF is preferable. The content of the binder is preferably 0.1 to 10% by mass, and more preferably 1 to 5% by mass, with respect to the mass of the intermediate layer 32. The contents of the metal compound particles 35, the conductive agent 36, and the binder in the intermediate layer 32 are determined by observing the cross section of the intermediate layer 32 with a scanning electron microscope (SEM) or a transmission electron microscope (TEM) and element mapping.

Figure 3:
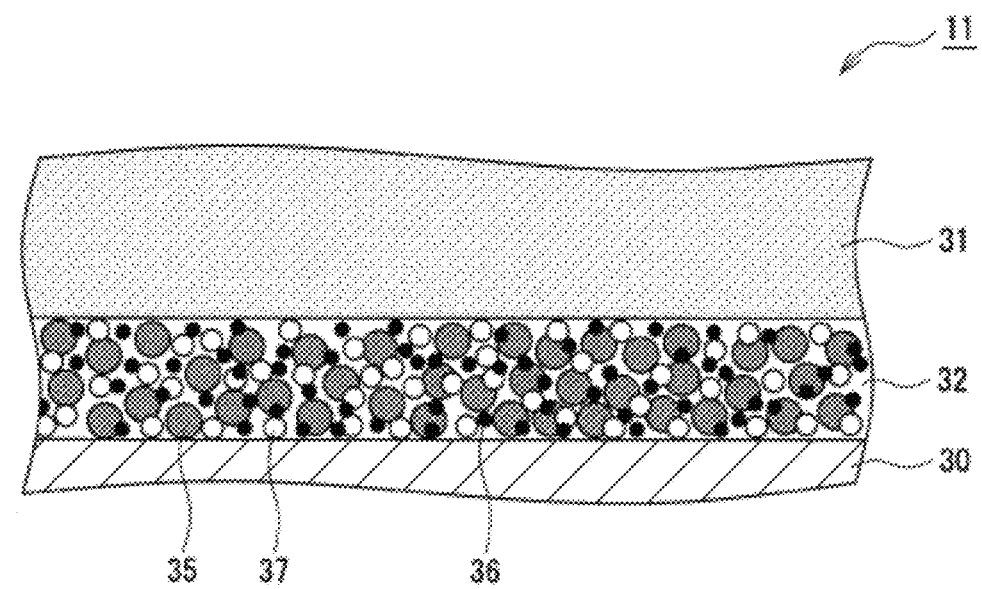
FIG. 3 is a sectional view of a positive electrode according to another example of the embodiment.

FIG. 3 is a sectional view of another example of the embodiment. The intermediate layer 32 exemplified in FIG. 3 differs from the form exemplified in FIG. 2 in that the metal compound particles 35 and metal phosphate particles 37 are included as inorganic particles. The combination of the metal compound particles 35 and the metal phosphate particles 37 improves the effect of suppressing heat generation when an internal short circuit occurs in the battery and the effect of suppressing gas generation during high temperature storage. The mass ratio of the metal compound particles 35 to the metal phosphate particles 37 is not particularly limited. An example of such mass ratios is 1:9 to 9:1 or 4:6 to 6:4. The contents of the metal compound particles 35 and metal phosphate particles 37 may be the same as each other. When the intermediate layer 32 includes the metal phosphate particles 37, the content is, for example, 5 to 90% by mass with respect to the mass of the intermediate layer 32. In FIG. 3, the metal phosphate particles 37 are shown in a smaller size than the metal compound particles 35, but the relationship between both particle sizes is not particularly limited.

The metal phosphate particles 37 included in the intermediate layer 32 are preferably nonferrous metal phosphates. Specific examples of the nonferrous metal phosphates include $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, $MgHPO_4$, $LiCl$—$LiSP_3O_{10}$, $LiCl$—$Li_7P_5O_{16}$, $LiCl$—$LiPO_3$, $LiCl$—$Li_2O$—$P_2O_5$, $L_2O$—$P_2O_5$, $AgI$—$AgPO_3$, $CuI$—$CuPO_3$, $PbF_2$—$MnF_2$—$Al(PO_4)_3$, $AgI$—$Ag_2O$—$P_2O_5$, $AlPO_4$, and $Mn_3(PO_4)_2 \cdot 3H_2O$.

Preferable examples of the metal phosphate particles 37 include at least one selected from lithium phosphate particles ($Li_3PO_4$ particles), lithium hydrogen phosphate particles ($Li_2HPO_4$ particles), aluminum phosphate particles ($AlPO_4$ particles), and manganese phosphate hydrate particles ($Mn_3(PO_4)_2 \cdot 3H_2O$ particles). In the intermediate layer 32, one metal phosphate particles 37 may be used singly, or two or more metal phosphate particles 37 may be used in combination.

An example of the volume-based median diameter (D50) of the metal phosphate particles 37 is 0.05 μm to 2 μm, and is preferably 0.1 μm to 1 μm. In addition, the aspect ratio of the metal phosphate particles 37 is 2 or more, for example. The Mohs hardness of the metal phosphate particles 37 is, for example, 7 or less, or 5 or less. The metal phosphate particles 37 may have the same median diameter, aspect ratio, and Mohs hardness as the metal compound particles 35.

As described above, the intermediate layer 32 can be formed by applying onto the surface of the positive electrode current collector 30 an intermediate layer slurry including the metal compound particles 35, the metal phosphate particles 37, the conductive agent 36, and a binder, and then drying the coating film. The dispersion medium of the intermediate layer slurry is not particularly limited, but a preferable example is N-methyl-2-pyrrolidone (NMP). The intermediate layer 32 is formed on the surface of the positive electrode current collector 30 at a surface density of, for example, 0.1 g/m² to 20 g/m².

The intermediate layer 32 may include inorganic particles other than the metal compound particles 35 and the metal phosphate particles 37, as long as the object of the present disclosure is not impaired. Examples of the inorganic particles include inorganic compounds with lower oxidizing power than lithium-containing transition metal oxides, specifically a manganese oxide, silicon dioxide, titanium dioxide, and aluminum oxide.

[Negative Electrode]

A negative electrode 12 comprises a negative electrode current collector and a negative electrode mixture layer formed on at least one surface of the negative electrode current collector. A foil of a metal stable in the potential range of the negative electrode 12 such as copper or copper alloy, a film in which the metal is disposed on the surface, or the like can be used as the negative electrode current collector. Preferably, the negative electrode mixture layer includes a negative electrode active material and a binder, and is formed on both sides of the negative electrode current collector. The negative electrode 12 can be produced by applying a negative electrode mixture slurry including a negative electrode active material and a binder onto a negative electrode current collector, drying the coating film, and then compressing to form the negative electrode mixture layer on both sides of the negative electrode current collector.

The negative electrode active material is not particularly limited as long as it can reversibly intercalate and deintercalate lithium ions, and a carbon material such as graphite is generally used. The graphite may be any of natural graphite such as flake graphite, lump graphite, and earth graphite and artificial graphite such as lump artificial graphite and graphitized mesophase carbon microbeads. In addition, as the negative electrode active material, metals such as Si and Sn that are alloyed with Li, metal compounds including Si and Sn, and lithium titanium composite oxides may be used. The Si-containing compound represented by $SiO_x$ ($0.5 \leq x \leq 1.6$) may be used in combination with a carbon material such as graphite.

As a binder included in the negative electrode mixture layer, fluorine-containing resin such as PTFE and PVdF PAN, polyimide, acrylic resin, and polyolefins may be used as in the case of the positive electrode 11, but styrene-butadiene rubber (SBR) is preferably used. In addition, the negative electrode mixture layer may include CMC or a salt thereof, polyacrylic acid (PAA) or a salt thereof, PVA, or the like. The negative electrode mixture layer 41 includes, for example, SBR and CMC or a salt thereof.

[Separator]

As a separator 13, a porous sheet having ion permeability and insulating property is used. Specific examples of the porous sheet include a microporous thin film, a woven fabric, and a non-woven fabric. As the material of the separator, polyolefins such as polyethylene and polypropylene, cellulose, and the like are suitable. The separator 13 may have a single-layer structure or a laminated structure. In addition, on the surface of the separator 13, a resin layer having high heat resistance such as an aramid resin or a filler layer including a filler of an inorganic compound may be provided.

EXAMPLES

Hereinafter, the present disclosure will be further described with reference to examples, but the present disclosure is not limited to these examples.

Example 1

[Production of Positive Electrode]

95 parts by mass of barium sulfate ($BaSO_4$) with a D50 of 0.2 μm and an aspect ratio of 2, 2 parts by mass of acetylene black (AB), and 3 parts by mass of polyvinylidene fluoride (PVdF) were mixed to prepare a particle mixture. Thereafter, the particle mixture was added to N-methyl-2-pyrrolidone (NMP) and was stirred to prepare an intermediate layer slurry. The slurry was applied onto both sides of the positive electrode current collector consisting of aluminum foil having a thickness of 15 μm and the coating film was dried to form an intermediate layer having a thickness of 3 μm.

A lithium-containing transition metal oxide represented by $LiNi_{0.5}Co_{0.2}Mn_{0.3}O_2$ was used as a positive electrode active material. A positive electrode active material, AB, and PVdF were mixed in a solid content mass ratio of 97:2:1 to prepare a positive electrode mixture slurry with NMP as a dispersion medium. Thereafter, the positive electrode mixture slurry was applied onto both sides of the positive electrode current collector on which the intermediate layer was formed, the coating film was dried, and the coating film was compressed to form a positive electrode mixture layer on both sides of the current collector via the intermediate layer. The current collector was cut into a predetermined electrode size to produce a positive electrode.

[Production of Negative Electrode]

Graphite powder, sodium salt of CMC, and dispersion of SBR were mixed at a solid content mass ratio of 98.7:0.7:0.6 to prepare a negative electrode mixture slurry with water as a dispersion medium. Thereafter, the negative electrode mixture slurry was applied onto both sides of the negative electrode current collector consisting of copper foil, the coating film was dried, and the coating film was compressed to form a negative electrode mixture layer on both sides of the current collector. The current collector was cut into a predetermined electrode size to produce a negative electrode.

[Preparation of Non-Aqueous Electrolyte]

Ethylene carbonate (EC), ethyl methyl carbonate (EMC), and dimethyl carbonate (DMC) were mixed in a volume ratio of 3:3:4. $LiPF_6$ was dissolved in the mixed solvent so as to obtain a concentration of 1.2 mol/L to prepare a non-aqueous electrolyte.

[Production of Battery]

An aluminum lead was attached to the above positive electrode, a nickel lead was attached to the above negative electrode, and the positive electrode and the negative electrode were spirally wound via a polyethylene separator to produce a wound electrode assembly. The electrode assembly was accommodated in a bottomed cylindrical battery case body having an outer diameter of 18.2 mm and a height of 65 mm, the above non-aqueous electrolyte solution was injected therein, the opening of the battery case body was sealed with a gasket and a sealing assembly to produce a cylindrical non-aqueous electrolyte secondary battery.

Example 2

A positive electrode and a secondary battery were produced in the same manner as in Example 1, except that magnesium hydroxide $(Mg(OH)_2)$ with a D50 of 0.05 μm and an aspect ratio of 3 was used instead of $BaSO_4$ in preparation of the intermediate layer slurry.

Example 3

A positive electrode and a secondary battery were produced in the same manner as in Example 1, except that magnesium oxide (MgO) with a D50 of 0.5 μm and an aspect ratio of 5 was used instead of $BaSO_4$ in preparation of the intermediate layer slurry.

Example 4

A positive electrode and a secondary battery were produced in the same manner as in Example 1, except that lithium oxide $(Li_2O)$ with a D50 of 2 μm and an aspect ratio of 2 was used instead of $BaSO_4$ in preparation of the intermediate layer slurry.

Example 5

A positive electrode and a secondary battery were produced in the same manner as in Example 1, except that $BaSO_4$ used in Example 1 and lithium phosphate $(Li_3PO_4)$ with a D50 of 0.5 μm and an aspect ratio of 2 were mixed in a mass ratio of 1:9 and the resultant mixture was used as inorganic particles in preparation of the intermediate layer slurry.

Example 6

A positive electrode and a secondary battery were produced in the same manner as in Example 2, except that MgO used in Example 2 and lithium hydrogen phosphate $(Li_2HPO_4)$ with a D50 of 0.5 μm and an aspect ratio of 2 were mixed in a mass ratio of 9:1 and the resultant mixture was used as inorganic particles in preparation of the intermediate layer slurry.

Example 7

A positive electrode and a secondary battery were produced in the same manner as in Example 1, except that $BaSO_4$ used in Example 1 and aluminum phosphate $(AlPO_4)$ with a D50 of 0.5 μm and an aspect ratio of 3 were mixed in a mass ratio of 1:1 and the resultant mixture was used as inorganic particles in preparation of the intermediate layer slurry.

Example 8

A positive electrode and a secondary battery were produced in the same manner as in Example 1, except that $BaSO_4$ used in Example 1 and manganese phosphate hydrate $(Mn_3(PO_4)_2 \cdot 3H_2O)$ with a D50 of 0.5 μm and an aspect ratio of 2 were mixed in a mass ratio of 9:1 and the resultant mixture was used as inorganic particles in preparation of the intermediate layer slurry.

Comparative Example 1

A positive electrode and a secondary battery were produced in the same manner as in Example 1, except that no intermediate layer was formed in production of the positive electrode.

Comparative Example 2

A positive electrode and a secondary battery were produced in the same manner as in Example 1, except that aluminum oxide $(Al_2O_3)$ with a D50 of 0.1 μm and an aspect ratio of 1 was used instead of $BaSO_4$ in preparation of the intermediate layer slurry.

[Nailing Test (Measurement of Battery Temperature)]

Each of the batteries in the examples and comparative examples was charged to the end-of-charge voltage of 4.2V with a constant current of 0.3 C, and then charged to the current value of 0.05 C with a constant voltage of 4.2V. Under the 25° C. environment, a round nail pierced to the center of the side of the charged battery, the round nail was stopped piercing at the moment when the round nail completely penetrated the battery, and the temperature on the side of the battery was measured after one minute.

[Test of High Temperature Storage (Measurement of Amount of Gas Generated)]

Each of the batteries in the examples and comparative examples was charged under the above conditions and then allowed to stand for 90 days at a temperature condition of 55° C. Thereafter, the battery was opened by breaking the gasket thereof, the internal gas was collected, the gas volume was measured, and thereby the amount of gas generated was determined.

TABLE 1

| | Intermediate layer | | Battery performance evaluation | |
|---|---|---|---|---|
| | Inorganic particles | Mass ratio | Nailing test/ ° C. | Amount of gas generated/mL |
| Example 1 | $BaSO_4$ | — | 49 | 2.6 |
| Example 2 | $Mg(OH)_2$ | — | 50 | 2.6 |
| Example 3 | MgO | — | 55 | 2.7 |
| Example 4 | $Li_2O$ | — | 52 | 7.7 |
| Example 5 | $BaSO_4/Li_3PO_4$ | 1:9 | 49 | 2.3 |
| Example 6 | $Mg(OH)_2/Li_2HPO_4$ | 9:1 | 49 | 2.4 |
| Example 7 | $BaSO_4/AlPO_4$ | 1:1 | 55 | 2.0 |
| Example 8 | $BaSO_4/Mn_3(PO_4)_2/3H_2O$ | 9:1 | 55 | 2.6 |
| Comparative Example 1 | — | — | 120 | 5.5 |
| Comparative Example 2 | $Al_2O_3$ | — | 75 | 6.2 |

As can be seen from the results shown in Table 1, all batteries in the examples have a lower temperature rise in the test of short circuit and a lower amount of gas generated in the test of the high temperature storage than the batteries in the comparative examples. In addition, it was found that the battery in the examples with the use of inorganic particles including metal phosphate particles tends to suppress gas generation, as compared with the battery in the examples with the use of inorganic particles including no metal phosphate particles.

REFERENCE SIGNS LIST 10 secondary battery
11 positive electrode 12 negative electrode
13 separator
14 electrode assembly
15 battery case
16 exterior can
17 sealing assembly
18, 19 insulating plate
20 positive electrode lead
21 negative electrode lead
22 projecting portion
23 bottom plate
24 lower vent member
25 insulating member
26 upper vent member
27 cap
28 gasket
30 positive electrode current collector
31 Positive electrode mixture layer
32 Intermediate layer
35 Metal compound particles
36 Conductive agent
37 Metal phosphate particles

The invention claimed is:

1. A positive electrode for a secondary battery, comprising:
   a current collector;
   an intermediate layer formed on at least one surface of the current collector; and
   a mixture layer formed on the intermediate layer,
   wherein the intermediate layer comprises metal compound particles, a conductive agent, and a binder, and
   the metal compound particles are composed of at least one selected from a sulfate, a hydroxide, and an oxide of an alkaline earth metal or an alkali metal,
   wherein the metal compound particles are at least one selected from barium sulfate particles and lithium oxide particles.

2. The positive electrode for a secondary battery according to claim 1, wherein the intermediate layer further comprises metal phosphate particles.

3. The positive electrode for a secondary battery according to claim 2, wherein the metal phosphate particles are at least one selected from lithium phosphate particles, lithium hydrogen phosphate particles, aluminum phosphate particles, and manganese phosphate hydrate particles.

4. The positive electrode for a secondary battery according to claim 2, wherein the metal compound particles and the metal phosphate particles have a volume-based median diameter of 0.05 μm to 2 μm.

5. The positive electrode for a secondary battery according to claim 4, wherein the metal compound particles and the metal phosphate particles have an aspect ratio of 2 or more.

6. A secondary battery, comprising:
   the positive electrode for a secondary battery according to claim 1;
   a negative electrode; and
   an electrolyte.

7. A positive electrode for a secondary battery, comprising:
   a current collector;
   an intermediate layer formed on at least one surface of the current collector; and
   a mixture layer formed on the intermediate layer,
   wherein the intermediate layer comprises metal compound particles, a conductive agent, and a binder, and
   the metal compound particles are composed of at least one selected from a sulfate, a hydroxide, and an oxide of an alkaline earth metal or an alkali metal,
   wherein the intermediate layer further comprises metal phosphate particles.

8. The positive electrode for a secondary battery according to claim 7, wherein the metal compound particles are at least one selected from barium sulfate particles, magnesium hydroxide particles, magnesium oxide particles, and lithium oxide particles.

9. The positive electrode for a secondary battery according to claim 7, wherein the metal phosphate particles are at least one selected from lithium phosphate particles, lithium hydrogen phosphate particles, aluminum phosphate particles, and manganese phosphate hydrate particles.

10. The positive electrode for a secondary battery according to claim 7, wherein the metal compound particles and the metal phosphate particles have a volume-based median diameter of 0.05 μm to 2 μm.

11. The positive electrode for a secondary battery according to claim 10, wherein the metal compound particles and the metal phosphate particles have an aspect ratio of 2 or more.

12. A secondary battery, comprising:
    the positive electrode for a secondary battery according to claim 7;
    a negative electrode; and
    an electrolyte.

* * * * *